United States Patent [19]

Mitchell et al.

[11] 4,278,117
[45] Jul. 14, 1981

[54] THREE DIMENSIONAL DUPLICATING CARVING MACHINE

[75] Inventors: Richard L. Mitchell, Florissant; Richard B. Brundage, Ladue, both of Mo.; Donald L. Blachly, Excelsior Township, Sauk County, Wis.

[73] Assignee: Emerson Electric Co., St. Louis, Mo.

[21] Appl. No.: 73,744

[22] Filed: Sep. 10, 1979

[51] Int. Cl.³ .............................................. B27C 5/00
[52] U.S. Cl. .............................. 144/144 R; 144/323; 409/89; 409/90; 409/92; 409/121
[58] Field of Search ................. 142/7; 409/86, 87, 88, 409/89, 90, 92, 94, 97, 107, 115, 121, 124, 125; 144/137, 144 R, 144 A, 144 S, 323

[56] References Cited

U.S. PATENT DOCUMENTS

| | | | |
|---|---|---|---|
| 1,039,406 | 9/1912 | Hundrieser | 409/89 |
| 2,185,011 | 12/1939 | Anderson | 409/90 |
| 3,211,061 | 10/1965 | Cretsinger | 409/89 |
| 3,299,779 | 1/1967 | Wolf | 409/89 |
| 3,543,636 | 12/1970 | Tracy | 144/144 R |
| 3,739,824 | 6/1973 | Hoeing | 409/88 |
| 4,078,474 | 3/1978 | Laskowski | 144/144 R |

*Primary Examiner*—W. D. Bray
*Attorney, Agent, or Firm*—Charles E. Markham

[57] ABSTRACT

A duplicating carving machine for the home workshop of the kind in which a guiding stylus and router are movable horizontally in straight line perpendicular paths and vertically in an arcuate path. Rigid construction of the machine permits manipulation of the router from a safely remote point and includes means for mounting masters and work pieces having a wide variety of shapes and sizes so as to be conveniently accessible to the stylus and router, means for independently locking the stylus and router against horizontal movement in either direction at any point, means for locking the stylus and router in various angular positions with respect to tangency with their arcuate path of travel, and means for adjusting the spacing of the stylus and router.

10 Claims, 9 Drawing Figures

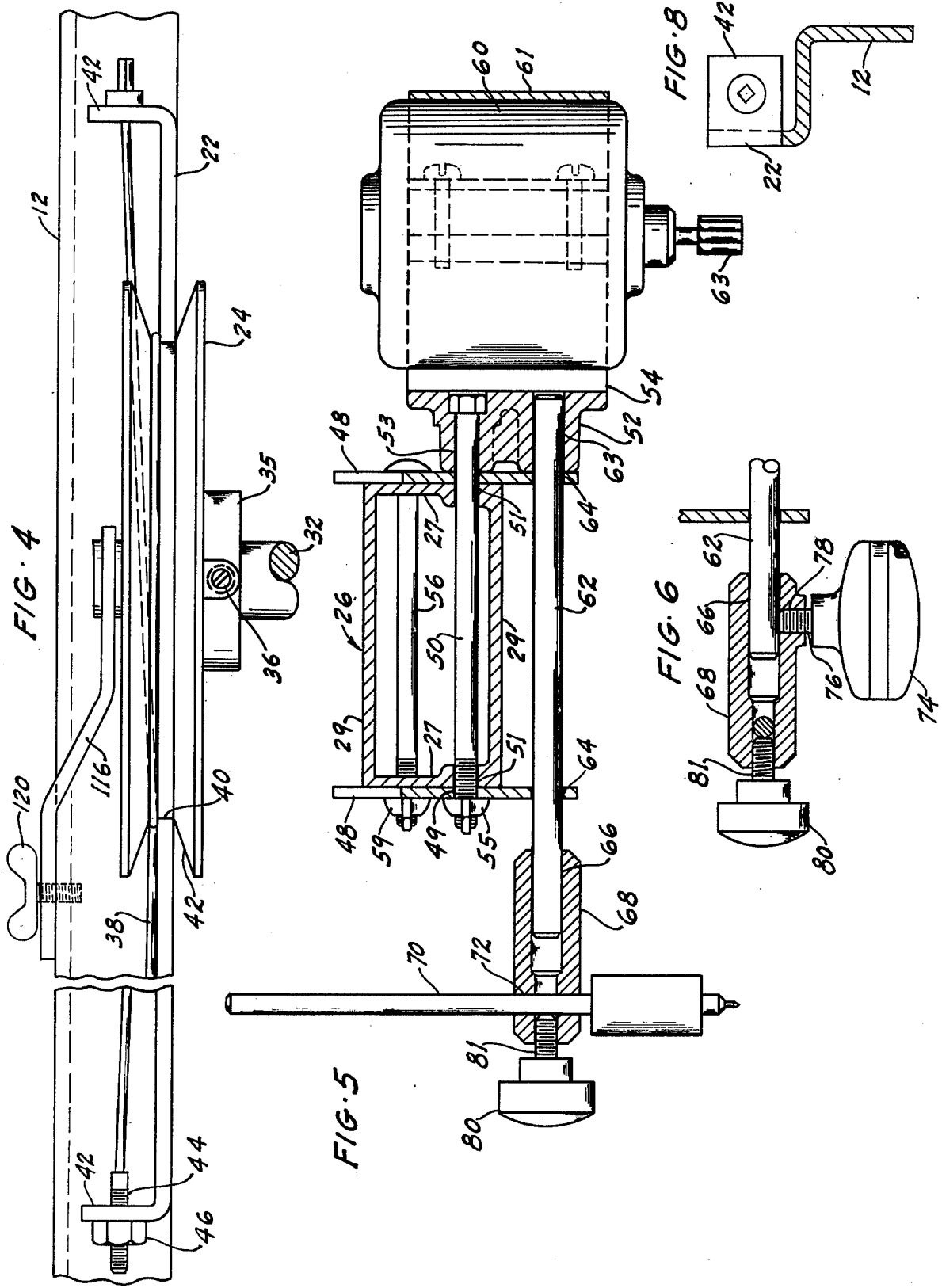

THREE DIMENSIONAL DUPLICATING CARVING MACHINE

This invention relates to machines for the three dimensional carving of wood, or like materials, which include a guiding stylus movable with a carving router for following the contours of an article to be reproduced.

THE PRIOR ART

The U.S. Pat. No. 3,739,824 to Hoenig discloses a three-dimensional carving machine capable of reproducing existing articles. In the Hoenig machine, the follower or stylus 98 and router 100 move vertically in a straight line. To accomplish this straight line vertical movement, the stylus 98 and router 100 are mounted on a vertical plate 80 which is vertically slidable on vertical guide rods 88 mounted on a horizontal table 36. Table 36 is slidably horizontally in one direction on horizontal guides mounted on an underlying table 24, and table 24 is, in turn, horizontally slidable in a perpendicular direction on guide rods 16 mounted on a frame 12. While there may be advantages in providing straight line vertical movement of the follower and router on costly production machines, the complexity, multiplicity of parts, and cost of construction of this device is excessive for a home workshop machine.

The U.S. Pat. No. 4,078,474 to Laskowski discloses a simplified, three-dimensional carving machine suitable for home workshop use and capable of reproducing some existing articles. In the Laskowski machine, the stylus and router are mounted in fixed spaced relationship on a horizontal shaft 31, which shaft is, in turn, mounted for rotation on horizontal shaft 28. The stylus and router are therefore movable vertically in an arcuate path about the center of shaft 28. Shaft 31 is, however, freely rotatable in bracket 30 so that the stylus and router must at all times be held in a suitable position for the instant carving operation.

It is advantageous in the interest of safety and convenience to provide means for limiting the swing of the router and for adjustably fixing the swing of the stylus and router with respect to tangency with their vertical arcuate path of movement. Limiting the swing of the router precludes its inadvertent swing to a position potentially hazardous to the operator. Adjustably positioning the stylus and router relieves the operator of constantly maintaining the proper attitude of the stylus and router when carving in bas-relief, such as, for example, the letters of a sign requiring only a relatively shallow depth of cut.

It is of further advantage in a machine of this kind to provide means for adjustably fixing the stylus and router in any position along either of its perpendicular horizontal paths of travel so that they may be moved repetitively back and forth along one horizontal path, when carving, without risk of any inadvertent movement along a perpendicular horizontal path.

It is further advantageous to provide means for varying the horizontal spacing of the stylus and router in a machine of this kind to accommodate routers of various body diameters.

OBJECTS OF THE INVENTION

An object of this invention is to provide a generally new and improved home workshop machine for three-dimensional carving and reproduction, which is economical of construction and safe and convenient to operate.

A further object is to provide a three-dimensional carving machine for reproduction work having a guiding stylus and a following router mounted for movement linearly in perpendicular horizontal paths and vertically in an arcuate path and including means for mounting masters and work pieces having a wide variety of shapes and sizes in fixed horizontal or vertical positions or for rotation on horizontal or vertical axes so as to be conveniently accessible to the stylus and router.

A further object is to provide a machine of this kind in which the stylus and router are also mounted so as to be tiltable in either direction from tangency with their vertical arcuate path of travel and in which means is provided for safely limiting the tilting of the stylus and router and for releasably fixing the stylus and router against tilting movement at any point within these limits.

A further object is to provide a machine of this kind having means for mounting routers of various body diameters and means for adjusting the spacing between the stylus and router so as to maintain a predetermined spacing when routers of various diameters are employed.

A further object is to provide a machine of this kind which includes means for adjustably fixing the limit of travel of the stylus and router in one horizontal direction and means for independently fixing the stylus and router against movement in either of their perpendicular horizontal directions and at any point therealong.

These and other objects and advantages will become apparent when reading the following description in connection with the accompanying drawings.

In the Drawings:

FIG. 4 is an enlarged fragmentary plan view of one of of the carriage wheels, track, and cable;

FIG. 5 is an enlarged cross-sectional view taken along line 5—5 of FIG. 3, showing the method of mounting the stylus and router on the carriage;

FIG. 6 is an enlarged cross-sectional view taken along line 6—6 of FIG. 2;

FIG. 7 is an enlarged, fragmentary, cross-sectional view taken along line 7—7 of FIG. 2, showing a master or work piece mounting board rotatably mounted on a support board;

FIG. 8 is a cross-sectional view taken along line 8—8 of FIG. 3; and

FIG. 9 is a side elevational view of one of the tilt plates shown alone.

DESCRIPTION OF A PREFERRED FORM OF THE INVENTION

Figure 1:
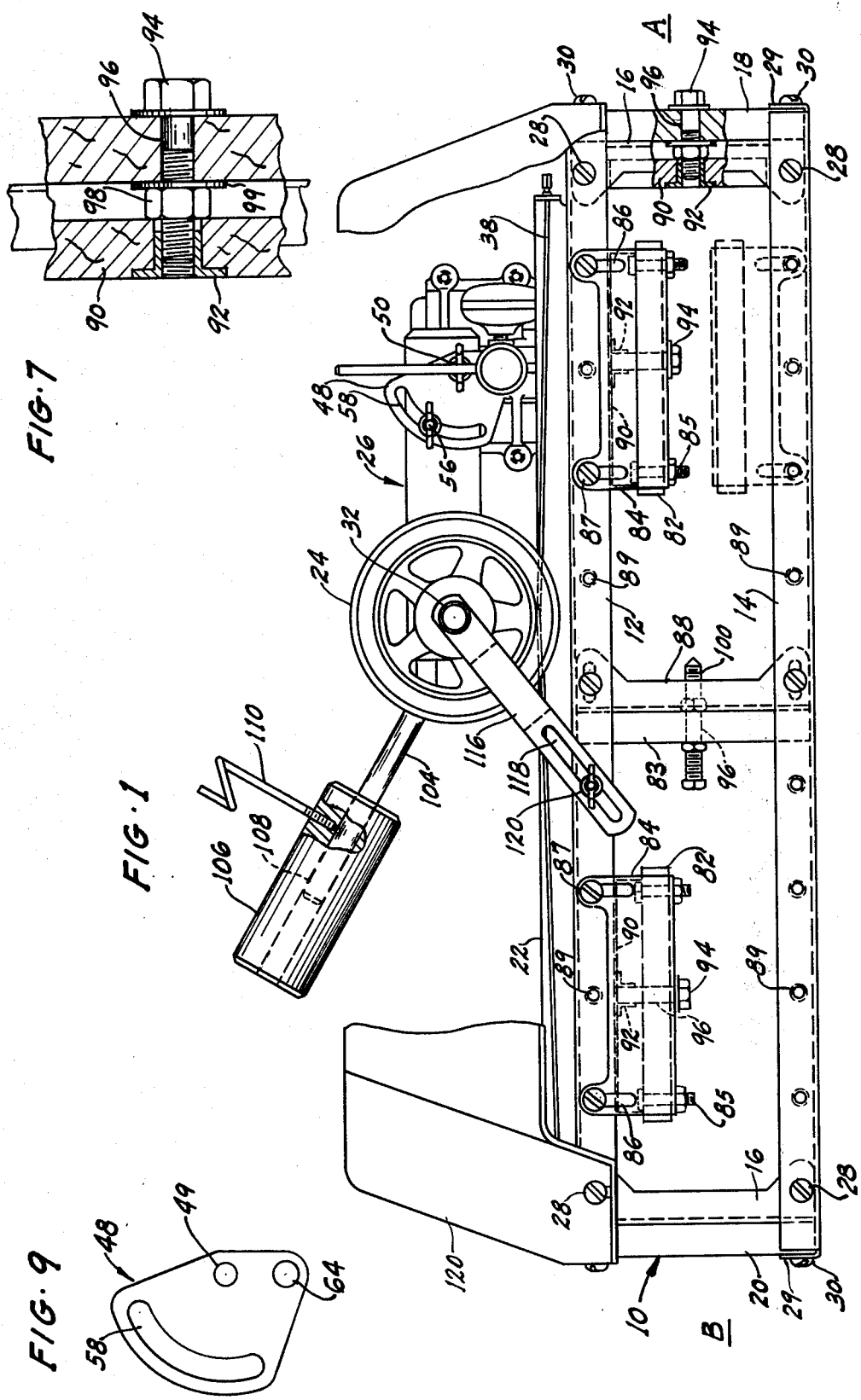
FIG. 1 is a side elevational view of a three-dimensional carving machine for reproduction work, constructed in accordance with the present invention.

Referring to the drawings in more detail, the machine includes a rigid, elongated, box-like frame with open sides, top, and bottom generally indicated at 10, having a forward closed end A and a rearward closed end B. Frame 10 comprises two longitudinally extending, upper horizontal members 12, two longitudinally extending, lower horizontal members 14, four vertical end members 16, a forward vertical end board 18, and a rear vertical end board 20. The frame members 12, 14, and 16 are metal angles, and the rectangular end boards are of wood or particle board. The upper horizontal angle frame members 12 each have an upturned portion of their horizontal flanges extending substantially the length thereof, forming a pair of spaced rails 22 on which the V-grooved wheels 24 of a carriage 26 travel. The vertical angle frame members 16 are connected to the vertical flanges of upper and lower horizontal frame members 12 and 14 by screws 28, see FIG. 1. The flanges of angle members 12 and 14 overlie the corners of rectangular end boards 18 and 20, and projecting horizontal flange portions 29 at the end of frame members 12 and 14 are formed vertically and connected to the end boards by screws 30, see FIG. 2.

Figure 3:
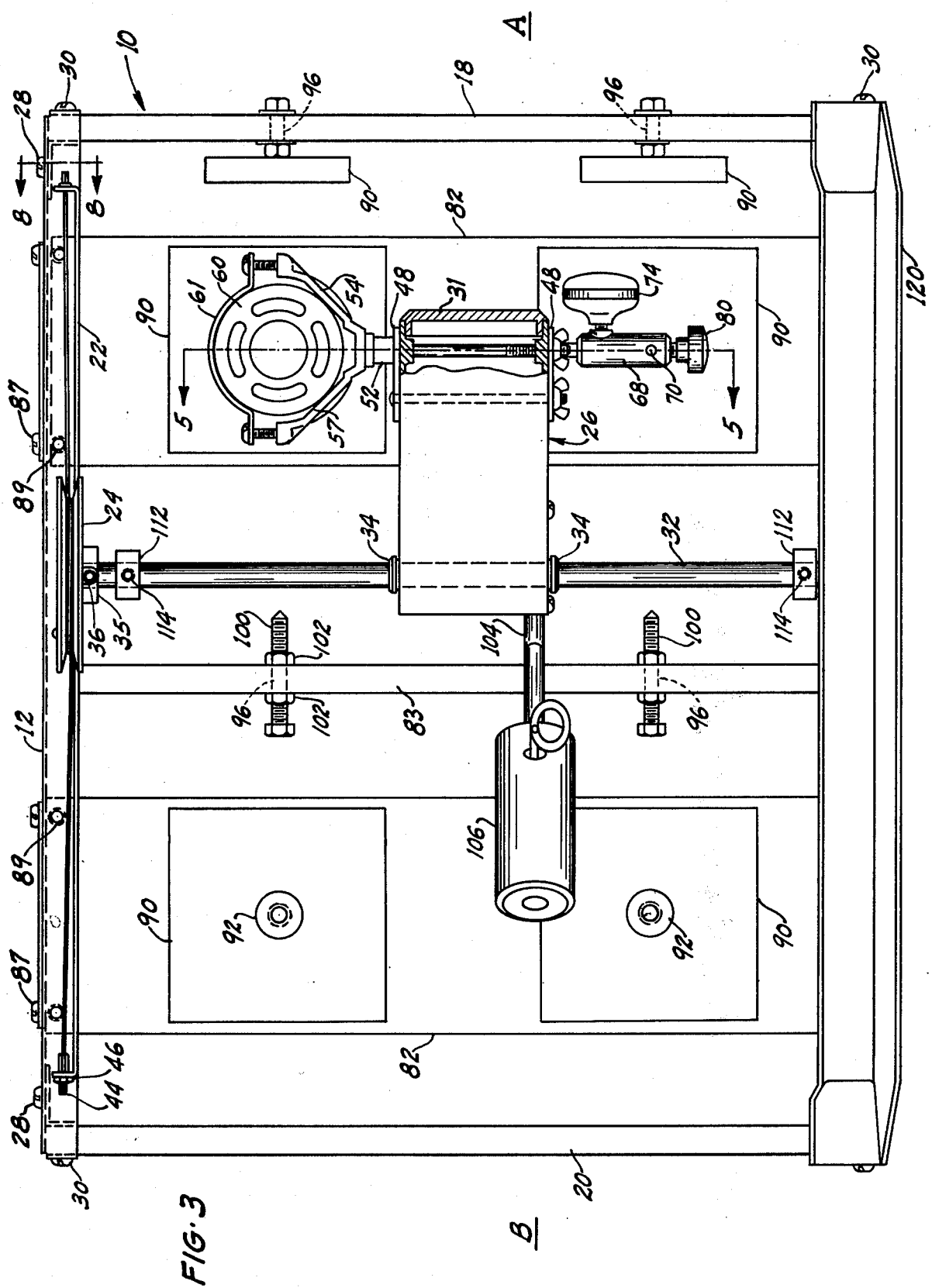
FIG. 3 is a top plan view of the machine shown in FIGS. 1 and 2.

The carriage 26 is an elongated, rectangular, rigid box having longitudinal sidewalls 27 parallel with frame members 12 and 14 and upper and lower walls 29 and end walls 31, see FIGS. 3 and 5. Carriage 26 is pivotally supported and freely slidable on a rigid horizontal and transversely extending shaft 32 passing through the carriage sidewalls near its rearward end. Frictionless bearings 34 mounted in the sidewalls of carriage 26 and journalling shaft 32 insure that the carriage is freely pivoted and freely slidable on shaft 32. The V-grooved wheels 24, which travel forwardly and rearwardly on rails 22, have their hub portions 35 fixed on the ends of shaft 32 by set screws 36 so that carriage 26 travels forwardly and rearwardly on rails 22. The carriage 26 is therefore freely movable horizontally in two perpendicular directions.

In order to maintain shaft 32 precisely perpendicular to rails 22 as the carriage is rolled forward and rearward, a pair of flexible cables 38 are provided. Referring to FIG. 4, each of the cables 38 encircle the flat bottom 40 of a V-groove 42 formed in the periphery of wheels 24 and lie along one side of the rails 22, which also engage the flat bottom 40. The flat bottom 40 of V-groove 42 is made just sufficiently wider than the thickness of rails 22 to permit the free winding and unwinding of the cables as wheels 24 roll on rails 22. The ends of cables 38 are attached to right-angularly formed end portions 42 of rails 22 and one end of each cable is clamped in a screw-threaded ferrule 44 provided with a take-up nut 46, so that suitable tension may be maintained.

A pair of vertical flat plates 48, see FIGS. 3 and 5, lying against the opposite, flat sidewalls 27 of carriage 26 near its forward end are rotatable on a horizontal bolt 50 passing through close-fitting apertures 49 in plates 48 and through close-fitting apertures 51 in the carriage sidewalls. The head end portion of bolt 50 extends beyond the plate 48 at one side of the carriage and passes through a bore 53 in the apex portion 52 of a V-shaped yoke 54. The apex portion 52 of yoke 54 has a vertically extending flat surface lying against the plate 48 at that side of the carriage. The opposite threaded end of bolt 50 extends beyond the plate 48 at the other side of the carriage and is fitted with a wing nut 55.

Figure 2:
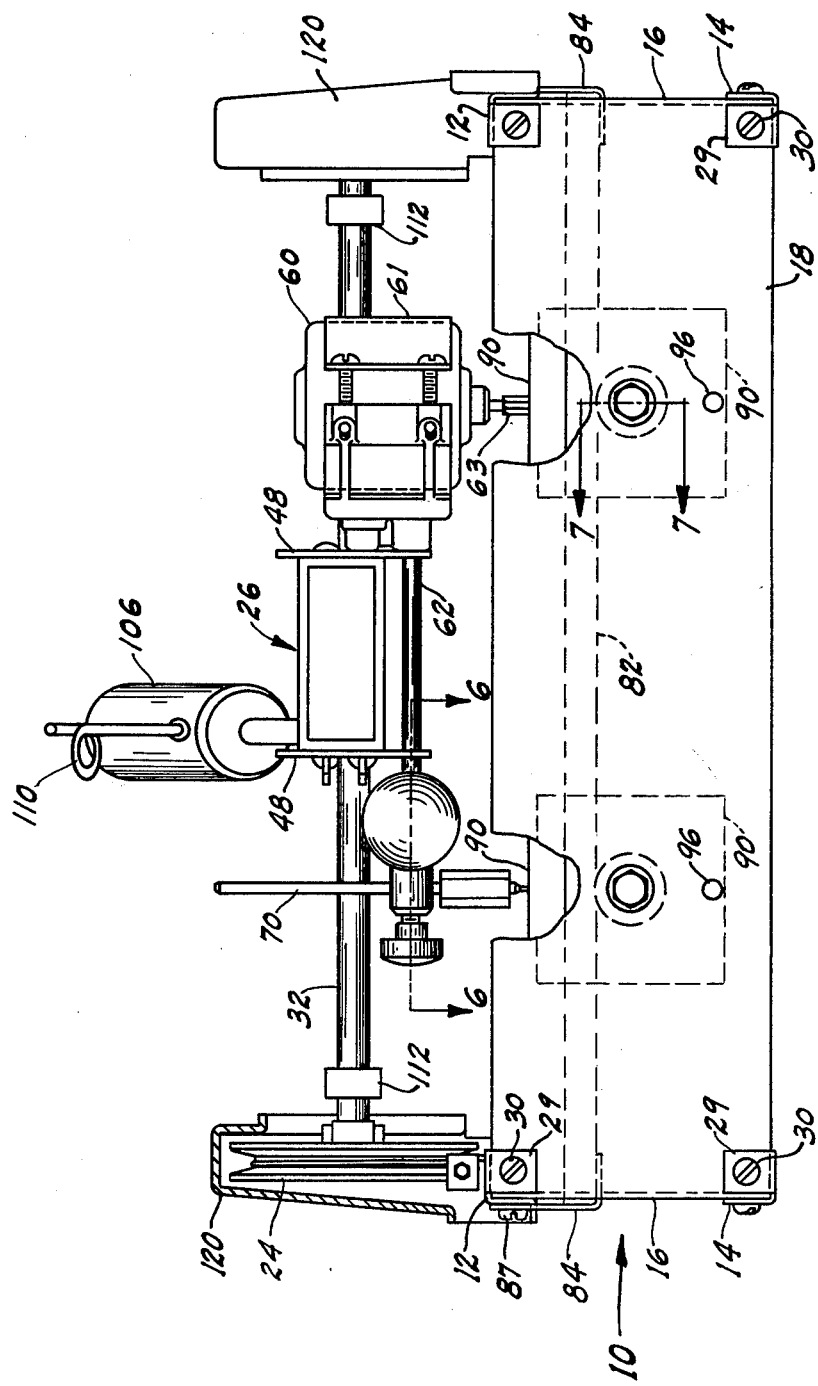
FIG. 2 is a forward end elevational view of the machine shown in FIG. 1.

A second horizontal bolt 56 spaced radially from bolt 50 passes through closely fitting apertures in the sidewalls of the carriage and through arcuate slots 58 in plates 48, see FIGS. 1 and 5. The arcuate slots 58 have their centers of curvature on the axis of bolt 50. The threaded end of bolt 56 is also fitted with a wing nut 59 so that when both wing nuts 55 and 59 are tightened, the plates 48 and V-yoke 54 are rigidly fixed against rotation about the axis of bolt 50. The diverging legs 57 of V-yoke 54, see FIG. 3, subtend an angle of approximately ninety degrees and are adapted to be engaged by the arcuate wall of the vertical cylindrical body of a router 60 and to center the vertical axis of the router and cutting tool 63 on the axis of bolt 50. An arcuate clamp 61 attached at its ends to the ends of yoke legs 55 by screws holds the router body rigidly in the yoke. It will be seen that routers with smaller diameter bodies than that shown in FIG. 2 may be suitably clamped in V-yoke 54 with the use of a flexible arcuate clamp 61 or with the use of a rigid arcuate clamp 61 having a smaller radius of curvature.

Referring to FIG. 5, a rigid horizontal rod 62 having one end thereof press fitted into a bore 63 in the apex portion 52 of V-yoke 54 extends therefrom through close fitting apertures 64 in plates 48 and is slidably received at its other end in a longitudinal bore 66 in one end portion of a ferrule 68. A vertical stylus 70 is slidably received in a transverse bore 72 in ferrule 68 near its other end. A handle 74 having a screw-threaded portion 76 screw threadedly engaged in a transverse screw-threaded bore 78 in ferrule 68 and engaging the rod 62 fixes the extent of entry of rod 62 in ferrule 68 when tightened thereagainst, see FIG. 6. The horizontal spacing of the router 60 and the stylus 70 is therefore readily adjustable. A second handle 80 having a screw-threaded portion 81 threadedly engaged in a reduced screw-threaded portion of bore 66 at the outer end of ferrule 68 and engaging the stylus fixes the stylus in a vertically adjusted position when tightened.

The apertures 64 in extended portions of plates 48 through which the rod 62 extends are spaced radially sufficiently below the axis of bolt 50 so that the rod 62 may be swung clear of the bottom and the end of carriage 26 when wing nuts 55 and 59 are loosened. However, when wing nuts 55 and 59 are loosened, the stylus and router may be swung freely on the axis of bolt 50 only within the limits permitted by the length of arcuate slots 58 in the plate 48. Preferably, and in the interest of safety, the angular position and length of slots 58 are such as to limit the swing of the axes of the stylus and router to not more than forty-five degrees either way from tangency with their vertical arc of travel about the shaft 32.

Means for the mounting of masters to be followed by the stylus and the work pieces to be carved by the router include transversely extending horizontal support boards 82, each carried by and attached at their ends by bolts 85 to the horizontal flanges of a pair of vertically adjustable angle brackets 84. The wider vertical flanges of angle brackets 84 are provided with spaced, vertically elongated slots 86 receiving screws 87 which are engageable in any of a plurality of longitudinally spaced screw-threaded holes 89 in vertical flanges of upper or lower angle frame members 12 and 14, see FIG. 1. This arrangement provides a wide range of longitudinal and vertical adjustment of the transversely extending support boards 82. The support boards 82 may also be placed on the horizontal flanges of upper horizontal frame members 12 and attached thereto by screws engaged in screw-threaded holes 89 spaced along the horizontal flanges of members 12.

The forward vertical end board 18 and an intermediate, transversely extending, vertical support board 83 attached at its ends to horizontally adjustable and vertically arranged angle brackets 88 provide support means for the mounting therebetween of masters and work pieces of various lengths. Mounting boards 90 on which the masters and work pieces are mounted are square and are arranged for either rotatable or fixed mounting on the horizontal support boards 82 and or vertical end board 18. Each of the mounting boards 90 is provided with an internally screw-threaded ferrule 92 fixed in an aperture in the center thereof. The ferrules 92 receive the threaded end portion of a hexagon or square-headed bolt 94 passing through clearance holes 96 in the support boards. The mounting boards 90 may therefore be rotated when bolts 94 are loosened and fixed when bolts 94 are tightened. When mounting boards 90 are to be mounted for constant free rotation, they are spaced from the support boards by jamb nut 98 and washer 99 on the bolt 94, see FIG. 7. When jamb nut 98 is suitably tightened against the adjacent side of mounting board 90, the board may be freely rotated in either direction by suitable handle means fitted on the head of bolt 94.

When a carving operation does not require constant rotation of the master and work piece, the washer 99 and jamb nut 98 are deleted, and the bolt 94 is loosened and tightened as required, to permit intermittent rotation. As an alternate means for mounting one end of elongated existing objects and work pieces for rotation on a horizontal axis, a pair of screw threaded centering pins 100 passing through clearance holes 96 in intermediate support board 86 are provided. Centering pins 100 are provided with conically pointed ends and have jamb nuts 102 thereon for adjustably fixing their extension toward the vertical mounting boards 90. A plurality of vertically spaced holes 96 in end board 18 and intermediate support board 88 are provided so that objects to be duplicated and work pieces may be mounted for rotation at various heights.

Attached to the rearward end of carriage 26 rearwardly of the shaft 32 and extending rearwardly of the carriage is a rod 104 carrying thereon a cylindrical counterweight 106. The counterweight has a longitudinal bore 108 slidably receiving rod 104 and is held adjustably positioned on rod 104 by a formed rod 110 so as to nicely counterbalance the carriage 26. One end portion of rod 110 is screw threaded and threadedly engaged in a transverse screw-threaded bore intersecting longitudinal bore 108, so that when tightened against rod 104, the counterweight is held in an adjusted position along rod 104. The other end of rod 110 is spirally formed to receive and hold a flexible power lead (not shown) extending from a source of power to the electrically operated router.

Means to variably limit or prevent any transverse horizontal travel of carriage 26 along shaft 32 is provided in the form of two stop collars 112 slidably mounted on shaft 32 on opposite sides of carriage 26. Collars 112 are each provided with a set screw 114 for fixing them in an adjusted position along shaft 32. Means for locking the carriage against longitudinal horizontal movement along rails 22 is provided in the form of a pair of arms 116. Each of the arms 116 has one end thereof pivotally attached to an end of shaft 32 outboard of the wheel 24. The other end portions of arms 116 lie against the vertical flanges of upper frame members 12 and are provided with elongated slots 118 therein which receive wing-headed screws 120 threadedly engageable in any of the longitudinally spaced screw-threaded holes 89 in the vertical flanges of frame members 12. When wing screws 120 are tightened, movement of carriage 26 along rails 20 is prevented. The provision of elongated slots 118 and the spacing of screw-threaded holes 89 provide for fixing the carriage at substantially any point in its range of longitudinal travel. A pair of longitudinally extending shields 120 attached to the vertical flanges of frame members 12 by screws 28 enclose the wheels 24 throughout their travel.

OPERATION

When reproducing the lettering of a sign or performing other bas-relief carving on a horizontal surface in which the vertical cuts are relatively shallow, the axes of the stylus and router may be suitably adjusted and fixed, usually in a substantially vertical position, by loosening wing nuts 55 and 59, rotating plates 48, and then retightening the wing nuts. However, when tilting of the axes of the stylus and router is required for undercutting or to maintain a substantially vertical position of the stylus and router when deeper cuts or greater vertical movement is required, the wing nuts 55 and 59 may be loosened just sufficiently to permit such tilting with the application of a slight force.

When upper surface carving is to be done on a relatively long and narrow work piece, the master and work piece may be placed on and suitably secured to the pairs of longitudinally spaced horizontal mounting boards 90 or directly on the spaced horizontal support boards 82 in alignment with the stylus and router, respectively.

When the master and work piece are to be mounted on the forward horizontal mounting boards 90 and it is desired to rotate the master and work piece intermittently about a vertical axis, the mounting boards 90 are attached on the forward horizontal support board 82 by the bolts 94. Equal rotation of the square mounting boards 90 may be determined at ninety degree intervals by placing a straightedge against the edges of the boards. If it is desired to check uniform rotation at more frequent intervals, the boards 90 may be made hexagon or octagon in shape. Usually, in three dimensional carving, it is necessary to mount the master and work piece for intermittent rotation on horizontal axes for a portion of the carving to be done and on vertical axes for another portion. When it is desired to mount the master and work piece between the centering pins 100 and vertical mounting boards 90 for constant free rotation on a horizontal axis, as in spindle carving, the vertical mounting boards 90 are pivotally mounted on the forward vertical end board 18, as shown in FIG. 7, with one end of the master and work piece mounted on the boards and their other ends supported by the centering pins 100.

It will be appreciated that when mounting the master and work piece for rotation on either vertical or horizontal axes, it is highly essential that the axes of the stylus and router be spaced so as to precisely coincide with the axes of rotation of the respective mounting boards. The longitudinal adjustment of ferrule 68 on the rod 62 provides for adjustment of the lateral spacing of the stylus and router so as to precisely coincide with the lateral fixed spacing of the axes of rotation of the mounting boards. This provision becomes particularly essential when routers having various body diameters are employed.

The diameters of shafts 32 and 62, the spacing of carriage bearings 34, and the dimensions and construction of carriage 26 are such as to provide a rigidity which permits an operator to manipulate the router cutting tool 63 with his hands grasping the handles 74 and 80 adjacent the stylus and well away from the cutting tool. Also, the extensive contacting surfaces of plates 48 with the sides of rigid carriage 26 and the provision of the bolt 56, spaced from the pivoting bolt 50, insures that the axes of the stylus and router remain parallel with the sides of the carriage even when wing nuts 55 and 59 are slightly loosened to permit rotation of the stylus and router.

We claim:

1. A three-dimensional carving machine comprising; a frame having an upper horizontal surface, a horizontal shaft movable perpendicular to its axis along said surface, an elongated, rigid, box-like carriage having flat vertical sidewalls extending perpendicular to said shaft, said shaft passing through apertures in said sidewalls near one end of said carriage and said carriage being freely rotatable on and freely slidable along said shaft, a pair of flat plates lying against said flat carriage sidewalls on opposite sides of said carriage and near the other end thereof, a router mounting bracket lying against one of said plates at one side of said carriage, a router mounted in said bracket, a first bolt passing through apertures in said mounting bracket, said plates and said carriage sidewalls and having a nut thereon which when tightened holds said mounting bracket and said plates against said carriage sidewalls and prevents rotation thereof on said first bolt, said plates each having an arcuate slot therein with its center of curvature on said axis of said first bolt, a second bolt passing through said arcuate slots and through apertures in said carriage sidewalls and having a nut thereon which when tightened additionally holds said plates against said sidewalls, said mounting bracket and said plates each further including a portion thereof extending radially from the axis of said first bolt outwardly beyond said carriage sidewalls, a rod fixed at one end in said portion of said mounting bracket and extending therefrom parallel with said first and second bolts and through apertures in said portions of said plates, and a stylus mounted on the other end of said rod whereby said rod and said stylus may be swung in an arc about the axis of said first bolt limited by the length of said arcuate slots when said nuts on said first and second bolts are loosened.

2. The carving machine claimed in claim 1 in which said other end of said rod is variably entered into a longitudinal bore in one end of a ferrule and in which said stylus is adjustable vertically in a transverse bore near the other end of said ferrule whereby said router and stylus may be variably spaced.

3. A three-dimensional carving machine comprising; a rigid frame having two upper and two lower horizontal angle frame members connected at their ends to forward and rearward rectangular end boards, a stylus and a router interconnected in horizontal spaced relationship and mounted on and above said upper angle frame members for vertical movement and for horizontal movement in perpendicular directions, a horizontal support board extending transversely between said angle frame members for mounting a master and work piece thereon, a pair of angle brackets having horizontal flanges for supporting the ends of said support board, said horizontal flanges and the ends of said support board having similarly spaced holes therein for receiving attaching bolts, said angle brackets also having vertical flanges for their connection to the vertical flanges of said upper or lower horizontal angle frame members, said vertical bracket flanges having horizontally spaced, vertically elongated slots therein, and said upper and lower horizontal angle members having screw-threaded holes in the vertical flanges thereof and spaced therealong equal to the horizontal spacing of said vertically elongated slots for receiving attaching screws passing through said bracket slots whereby said support board may be variably positioned vertically and horizontally over a wide range.

4. The carving machine claimed in claim 3 which includes two pair of said angle brackets and two of said support boards for supporting an elongated master and work piece extending parallel with said angle frame members.

5. The carving machine claimed in claim 3 which includes screw-threaded holes in the horizontal flanges of said upper angle frame members spaced therealong at the same spacing as said holes in the ends of said support board whereby said support board may also be positioned to overlie the horizontal flanges of said upper frame members and be directly connected thereto by screws.

6. The carving machine claimed in claim 3 which further includes a pair of mounting boards for mounting a master and a work piece thereon, said mounting boards each having a central screw-threaded hole therein and said horizontal support board and said forward vertical end board having horizontally spaced clearance holes therein for the passage of screws threadedly engageable in said central screw-threaded holes in said mounting boards, whereby said mounting boards may be mounted horizontally on said horizontal support board or vertically on said forward vertical end board and whereby said mounting boards may be rotated on screws when they are loosened or they may be fixed when said screws are tightened.

7. The carving machine claimed in claim 6 in which said mounting boards have straight equal sides.

8. The carving machine claimed in claim 3 which further includes a vertically arranged intermediate support board connected to said upper and lower angle frame members and having a pair of centering pins mounted therein and aligned with said clearance holes in said forward end board.

9. A three-dimensional carving machine comprising a frame having an upper horizontal surface, a horizontal shaft movable perpendicular to its axis along said surface, a carriage rotatably and slidably mounted on said shaft, a stylus and a router mounted on said carriage for rotation on an axis spaced from and parallel with said shaft, means for limiting rotational movement of said stylus and router on said carriage, means for releasably locking said stylus and router against rotational movement on said carriage at any point within its limited rotational movement, and means for releasably locking said shaft against movement perpendicular to its axis at various points along said frame surface.

10. The carving machine claimed in claim 9 in which said router is fixed on one end of a rod intermediately supported on said carriage and in which said stylus is slidably adjustable on an opposite end portion of said rod.

* * * * *